R. NETTER.
TIRE PROTECTOR.
APPLICATION FILED NOV. 15, 1919. RENEWED NOV. 16, 1920.
1,378,605.
Patented May 17, 1921.
2 SHEETS—SHEET 1.
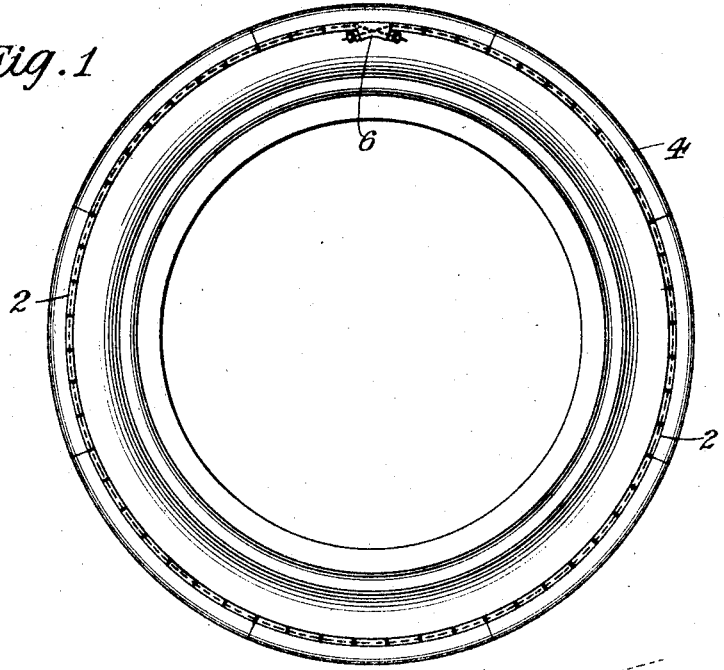
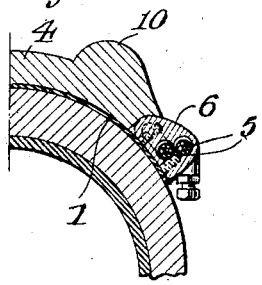
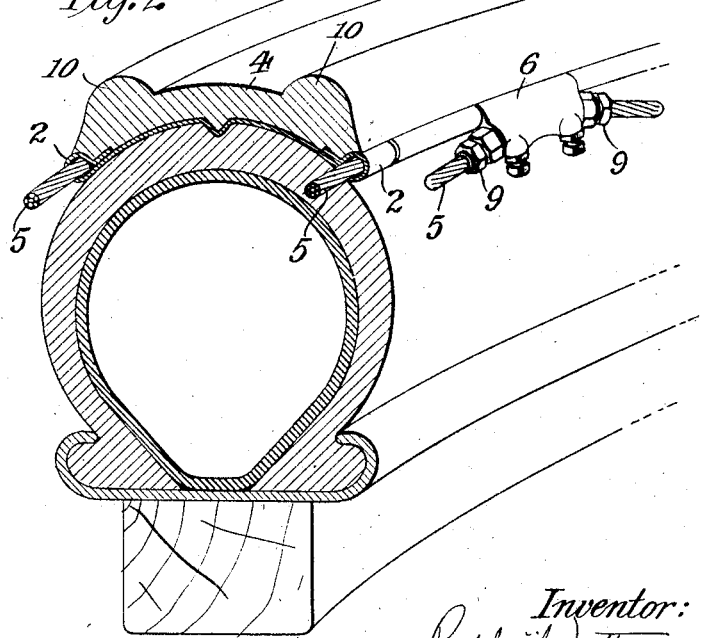
Inventor:
Raphail Netter
By Kerr, Page, Cooper & Hayward
Att'ys R. NETTER.
TIRE PROTECTOR.
APPLICATION FILED NOV. 15, 1919. RENEWED NOV. 16, 1920.
1,378,605.
Patented May 17, 1921.
2 SHEETS—SHEET 2.
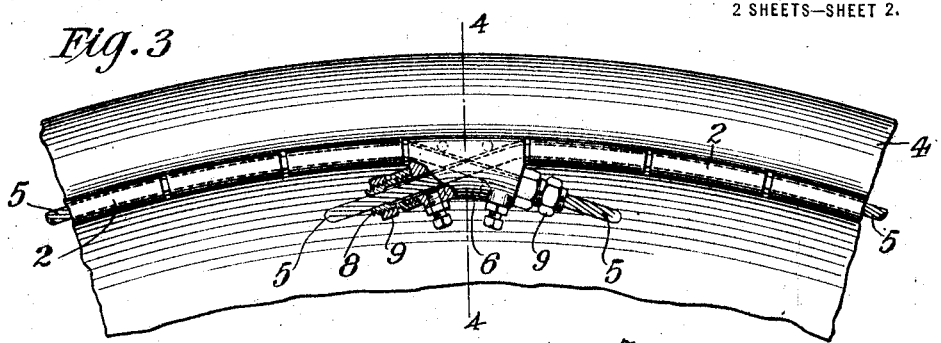
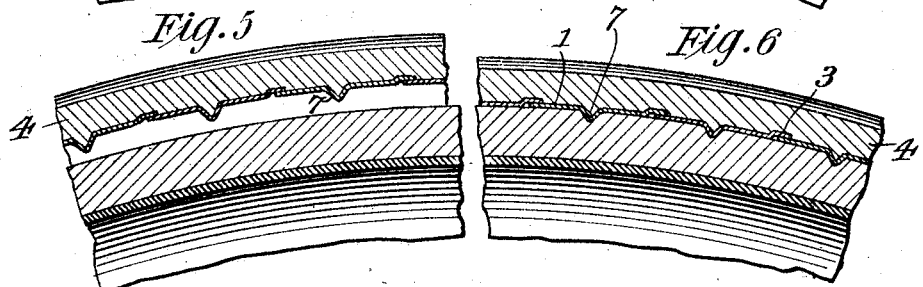
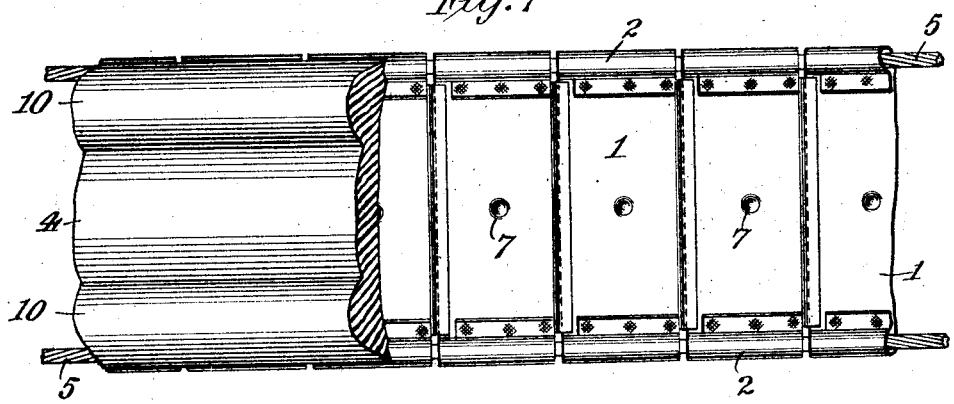
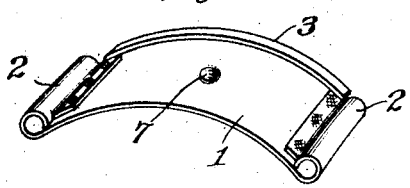
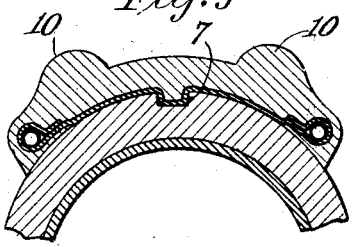
Inventor:
Raphaël Netter
By Kerr, Page, Cooper & Hayward
Att'ys.

UNITED STATES PATENT OFFICE.

RAPHAËL NETTER, OF NEW YORK, N. Y., ASSIGNOR TO MARVIN C. ALTMAYER, OF NEW YORK, N. Y.

TIRE-PROTECTOR.

1,378,605.  Specification of Letters Patent.  Patented May 17, 1921.

Application filed November 15, 1919, Serial No. 338,201. Renewed November 16, 1920. Serial No. 424,509.

*To all whom it may concern:*

Be it known that I, RAPHAËL NETTER, a citizen of the Republic of France, residing at New York, in the county and State of New York, have invented certain new and useful Improvements in Tire-Protectors, of which the following is a full, clear, and exact description.

In a patent granted to Marvin C. Altmayer, No. 1,307,531, on June 24, 1919, there is shown and described a protector for automobile tires, comprising, in general terms of description, a protective band, preferably non-puncturable which by suitable means is held in place over the tread of the tire, and prevented from displacement or creeping thereon. In this application for Letters Patent I shall set forth an improvement on this form of protector which I have devised and perfected to better meet the severe requirements of practical use, and to more fully comply with the demand for a more simple and economical device for this purpose.

According to this, my improvement, I make up a band of overlapping or telescoping steel or other metal plates with side loops, to which is vulcanized or about which is molded a coating or tread surface of rubber, and this band I secure upon the tread of a tire by means of flexible wires or cables passed through the pockets formed by the side loops, and properly secured at their ends to a part integral with or secured to one of the metal plates. I also make provision for securing this protector band in fixed relation to the tire, or in other words to prevent its creeping, and for the better protection of the metal plates associated with it I fashion or mold the tread surface in a novel manner, as will be hereinafter more fully set forth.

These improvements, and the other details of construction which characterize my invention, are illustrated in the accompanying drawings in which—

Figure 1 is a side view in elevation of a tire equipped with my improved protector.

Fig. 2 is an enlarged sectional perspective of the improved device attached to a tire and mounted on a rim.

Fig. 3 is a side elevation of a portion of a tire equipped with the protector and showing the means of fastening the same.

Fig. 4 is a sectional detail of the fastening devices on line 4—4 Fig. 3.

Fig. 5 is a sectional detail showing the protector raised from the tire.

Fig. 6 is a similar view showing the protector in its ultimate position on a tire.

Fig. 7 is a plan view and part section of the protector band.

Fig. 8 is a perspective of one of the metal plates used in the protector, and

Fig. 9 is a sectional view illustrating a modification of the protector.

I have used the same reference numerals throughout to designate corresponding parts in the several figures.

In building the protector band I form plates 1, Fig. 8, of steel or other suitable metal, generally by stamping. These plates are made to conform to the surface contour of an inflated tire of given dimensions and their side edges are turned back and spot welded or otherwise secured to form loops 2 along the sides, which in the completed band form circumferential pockets. One end of each plate is furthermore struck up and extended as at 3 to overlap or telescope with an adjacent plate.

These plates are laid out in a row, the length of which is approximately that of the periphery of the tire to which they are to be applied, and a tread surface of rubber 4 is molded to or around them and vulcanized so as to adhere thereto. This tread may be in one piece or may be in sections, this being an immaterial consideration.

The band when thus formed is laid over the tread surface of the tire, which at the time is wholly or partially deflated, and flexible wires or cables 5 are threaded through the continuous pockets formed by the side loops 2, their ends brought out through a solid block 6, secured to the extended flattened edges of one of the plates 1, and drawn tight and secured. When, then, the tire is inflated a firm union of the same and the protector or bearing band is secured.

Certain details of construction are essential to the successful use and operation of this device. Primarily, the band should be so secured that it will not creep, and I prefer to accomplish this result by forming in each plate 1 a projection 7 which on the ultimate or final association of the band and tire will embed themselves in the surfaces of the latter, as shown in Figs. 5 and 6. If on the other hand the tire be heavy or solid, it is preferable to provide recesses in the tire tread into which the same or modified projections 7 on the plates may fit as shown in Fig. 9. By this means all creeping is effectually prevented.

Again it is necessary that each plate shall be firmly and equally drawn down into firm contact with the tire tread, for which purpose that one of the plates which is located at the point of fastening is flattened out at the sides instead of folded over, and a solid block of metal 6, Fig. 4, secured thereto. This block is properly fastened and perforated as indicated in Figs. 2 and 3, to permit of the ends of the wires or cables 5 to pass through it.

When the ends of the wires project from the blocks 6 they are drawn tight, by any suitable means, and a slotted or expansible sleeve 8 passed over them and attached by screw threads on nipples on the blocks 6. A tapered nut 9 is then screwed over the tapered end of the sleeve 8 and clamps it firmly to the wire and securely connects the latter to the block 6.

The configuration of the rubber tread for the protector band is not a matter of indifference. If the surface conform to that of a true circle, then the weight of the car falls on its central line or highest point, and hence upon the central line of the metal plates. This tends to warp the edges of the plates outwardly and impairs the practical value of the device. If, however, I form along each edge of the tread a ridge or projection 10, then the weight is taken by the edges of the band, which tends to keep the side edges of the metal plates down upon the rounded surface of the tire. This is an important item.

It has been found moreover that when the surface of the tire is not a true arc of a circle, the edges of the metal plates which come in contact therewith are liable to chafe or wear such surface. To avoid this I so form the tread where it underlies the edges of the metal plates as shown in Fig. 9. This may readily be done by using a divided mold, and when the metal edges are thus covered and protected there is no tendency for them to wear the tire unduly.

Practical experience with this device has demonstrated its most remarkable value and efficiency. These bands can be made and sold at a small fraction of the cost of a good tire. They can be most readily applied and used. Their presence on a tire cannot be detected by the occupants of the car nor observed except upon the most careful examination. The means for securing them in position is such as to preclude the access of mud or foreign matter between them and the tire, and they never budge from their positions unless the tire becomes practically deflated, when of course they are removed.

Having now described my invention, what I claim is:

1. A tire protector comprising a series of overlapping metal plates with a rubber tread united thereto, each plate being formed along each of its side edges with a loop extending from the end to end of said edge, the thus-formed loops constituting a practically continuous annular sectional metal pocket bordering each of the side edges of the tire protector, for receiving the flexible cable which binds the protector in place upon a tire.

2. A tire protector comprising a series of overlapping metal plates of a shape conforming to the tire to which they are to be applied, each plate but one having its edges folded back to form side loops, the said one plate having its edges flattened for the attachment thereto of a metal block and having an adherent rubber tread surface in combination with flexible wires or cables strung through the pockets formed by said loops and passing through perforations in the said blocks and means for securing the ends of said wires to said blocks.

3. A tire protector comprising a series of overlapping metal plates, an adherent rubber tread formed along its side edges with circumferential ribs projecting above the rim face of that portion of the rubber tread between them, which take the weight that falls upon the protectors and afford two lines of pressure upon the metal overlapping plates along the opposite side edges of the same which hold them firmly against the outer surface of the tire at these points and prevent the warping and flattening of the plates under pressure, and means for securing the band upon the tread surface of an inflated tire.

In testimony whereof I hereunto affix my signature.

RAPHAËL NETTER.